(12) United States Patent
He et al.

(10) Patent No.: US 7,643,451 B2
(45) Date of Patent: Jan. 5, 2010

(54) METHOD AND APPARATUS FOR EXTENDING A MOBILE UNIT DATA PATH BETWEEN ACCESS POINTS

(75) Inventors: Haixiang He, Woburn, MA (US); Darwin Engwer, Portland, OR (US)

(73) Assignee: Nortel Networks Limited, St. Laurent, Quebec ( * ) Notice: Subject to any disclaimer, the term of this patent is extended or adjusted under 35 U.S.C. 154(b) by 294 days.

(21) Appl. No.: 11/251,237

(22) Filed: Oct. 14, 2005

(65) Prior Publication Data

US 2006/0083201 A1    Apr. 20, 2006

Related U.S. Application Data

(60) Provisional application No. 60/619,346, filed on Oct. 15, 2004.

(51) Int. Cl.
H04Q 7/00    (2006.01)

(52) U.S. Cl. .................. 370/331; 370/330; 370/342; 370/338; 370/310.2; 370/441; 455/436; 455/441; 455/461; 455/426.1

(58) Field of Classification Search .......... 370/331, 370/332, 338, 310.2, 441, 342; 455/436, 455/441, 461

See application file for complete search history.

(56) References Cited

U.S. PATENT DOCUMENTS

| 6,418,130 | B1 * | 7/2002 | Cheng et al. ................ 370/331 |
| 6,421,714 | B1 * | 7/2002 | Rai et al. .................... 709/217 |
| 6,512,754 | B2 * | 1/2003 | Feder et al. ................. 370/338 |
| 6,611,547 | B1 * | 8/2003 | Rauhala ...................... 370/331 |
| 6,711,147 | B1 * | 3/2004 | Barnes et al. ............... 370/338 |
| 6,768,726 | B2 * | 7/2004 | Dorenbosch et al. ....... 370/331 |
| 7,020,465 | B2 * | 3/2006 | O'Neill ....................... 455/432.1 |
| 7,079,521 | B2 * | 7/2006 | Holur et al. ................. 370/338 |
| 7,082,114 | B1 * | 7/2006 | Engwer et al. .............. 370/331 |
| 7,127,250 | B2 * | 10/2006 | Gallagher et al. .......... 455/436 |
| 7,146,130 | B2 * | 12/2006 | Hsu et al. .................... 455/3.04 |
| 7,154,854 | B1 * | 12/2006 | Zweig et al. ................ 370/236 |
| 7,177,321 | B2 * | 2/2007 | Bae ............................. 370/447 |

(Continued)

OTHER PUBLICATIONS

K. El Malki, et al., *Low Latency Handoffs in Mobile IPv4*, IETF Internet Draft, Dec. 2003, (52 pages), Nov. 2001.

(Continued)

*Primary Examiner*—Marceau Milord
(74) *Attorney, Agent, or Firm*—Anderson Gorecki & Manaras (57) ABSTRACT

Fast transitions between access points (APs) in a wireless network may be accomplished when a mobile unit (MU) moves between the APs, by causing a first tunnel to be established between the APs, and causing a second tunnel to be established between the new AP and the MU. A data path having established security and quality of service parameters between the MU and the old AP may be extended through the tunnels, so that communication with the MU is not disrupted while transitioning between APs. Transition processing thus may be decoupled from movement of the MU, so that the MU may continue to receive access to data over the data path. Optionally, once the data path has been so extended, the MU and new AP may engage in authentication and other messaging to formally affect a handover of the data path to the new AP. The APs and MU may be configured to communicate according to the 802.11 protocol.

23 Claims, 4 Drawing Sheets

U.S. PATENT DOCUMENTS

| | | | | |
|---|---|---|---|---|
| 7,212,821 B2 * | 5/2007 | Laroia et al. | | 455/437 |
| 7,236,470 B1 * | 6/2007 | Bims | | 370/328 |
| 7,257,105 B2 * | 8/2007 | Molteni et al. | | 370/338 |
| 7,333,793 B2 * | 2/2008 | Niemela et al. | | 455/336 |
| 7,339,903 B2 * | 3/2008 | O'Neill | | 370/313 |
| 7,339,908 B2 * | 3/2008 | Uhlik et al. | | 370/331 |
| 7,356,020 B2 * | 4/2008 | O'Neill | | 370/349 |
| 7,356,145 B2 * | 4/2008 | Ala-Laurila et al. | | 380/247 |
| 7,409,549 B1 * | 8/2008 | Leung et al. | | 713/168 |
| 7,447,162 B1 * | 11/2008 | Leung et al. | | 370/252 |
| 7,461,169 B2 * | 12/2008 | Chandra et al. | | 709/245 |

OTHER PUBLICATIONS

D. Halasz, *IEEE 802.11i draft & Call for Interest on Link Security for IEEE 802 Networks,* Nov. 2002 (12 pages).

L. Chen, et al., *Universal Seamless Handoff Architecture in Wireless Overlay Networks,* (4 pages), 2003.

A. Campbell, *IP Micro-Mobility Protocols,* (7 pages), Dec. 1999.

* cited by examiner

METHOD AND APPARATUS FOR EXTENDING A MOBILE UNIT DATA PATH BETWEEN ACCESS POINTS

CROSS-REFERENCE TO RELATED APPLICATIONS

This application claims priority to U.S. Provisional Patent Application No. 60/619,346, filed Oct. 15, 2004, entitled Method and Apparatus To Improve The IEEE 802.xx Mobility Performance By Tunneling IEEE §802.xx Traffic From an Existing Access Point to a "New" Access Point, the content of which is hereby incorporated herein by reference.

BACKGROUND

1. Field

This application relates to wireless communications and, more particularly, to a method and apparatus for extending a mobile unit data path between access points in a wireless network.

2. Description of the Related Art

Wireless networks generally include one or more access points located in an area to provide wireless services to mobile units with the area. Generally, a particular access point will be selected to provide wireless service to a given mobile unit. The selection may be based on quality of signal, load at the access point, and a number of other factors. Once selected, the mobile unit will communicate through the access point to receive wireless communication services on the wireless network. Although there are many different wireless protocols, the focus of this application will be on a protocol defined in the IEEE 802.11 standard.

As a mobile unit moves within a wireless network, it may move away from the access point that is providing it with service and need to find a new access point with which it may connect. The process of changing associations from one access point to another access point is commonly referred to as a handover. A mobile unit may need to perform a handover in other situations as well, for example where the access points are mobile, where an access point experiences failure, or in other situations where network conditions make it more desirable for a mobile unit to interface with a different access point.

When security is implemented on a wireless network, such as when 802.11i is implemented, the handover process may be relatively computationally intensive and require the mobile unit and access point to exchange many messages. Examples of the types of messages that may be exchanged include authentication request and response messages, reassociation request and response messages, security handshake messages such as the four-way 802.11i handshake or messages associated with the full authentication process specified in 802.1X. Additionally, the mobile unit and access point may exchange quality of service information such as the information specified in 802.11e (TSPEC), and optionally other messages. The processing associated with generating and responding to these messages may take a fair amount of time, which delays the handover between access points.

In addition to the messaging between the mobile unit and the access point, additional exchanges also may be required in connection with the handover. For example, the access point may be required to exchange messages with a back-end Authentication Server (AS), policy server (PS) in 802.11e, or other types of servers. The distance between the access point and these servers, the speed of the back-end network, the number of exchanges that must take place, and the congestion at the servers, all may contribute to delaying handovers between access points. Where the mobile unit is actively receiving or transmitting data, such as in connection with Voice over Internet Protocol (VoIP) and audio or video streaming, a relatively long handover-induced delay may be unacceptable. Particularly in situations where a given mobile unit may need to handover between access points relatively frequently, the delays associated with performing handovers may become unacceptable.

One way to attempt to accelerate the handover process is to cause some information associated with the mobile unit to be stored at neighboring access points other than the access point that is currently handling communications for that mobile unit. If a handover to a neighboring access point is then required, the theory is that the access point will have already completed part of the handover process to thereby enable the handover to occur more quickly. While this may work in particular situations, it requires every mobile unit to be known on multiple access points. This requires access points that are not responsible for a given mobile unit to expend processor resources to begin the handover process, and to use up valuable memory space to store information about a mobile unit that may never become active on that access point.

SUMMARY OF THE DISCLOSURE

A method and apparatus for enabling the transfer of a mobile unit data path between access points in a wireless network Fast transitions between access points in a wireless network may be accomplished by causing a tunnel to be established between an old access point and a new access point, and causing the data path between a mobile unit and the old access point to be extended through the data tunnel and the new access point. By allowing the data path to be extended through the new access point while leveraging the parameters of the association relationship established with the old access point, including for example security and quality of service, the data path to the mobile unit may remain open and communication with the mobile unit is not disrupted while transitioning between access points.

On the old access point, the data may be looped through the interfaces set up when the data path was initially established, so that the context associated with the data path does not need to be switched to enable the data to be tunneled across the network. Additionally, on the new access point, since the new access point is not responsible for security on the data path, the new access point may simply forward the data to the mobile unit without requiring the mobile unit to undergo authentication signaling. Thus, the transition between access points may be performed quickly to extend the data path through the new access point. Optionally, once the data path has been extended, the mobile unit and new access point may then engage in authentication and other messaging to formally affect a handover of the data path to the new access point.

Those skilled in the art will appreciate the scope of the present invention and realize additional aspects thereof after reading the following detailed description of the preferred embodiments in association with the accompanying figures.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
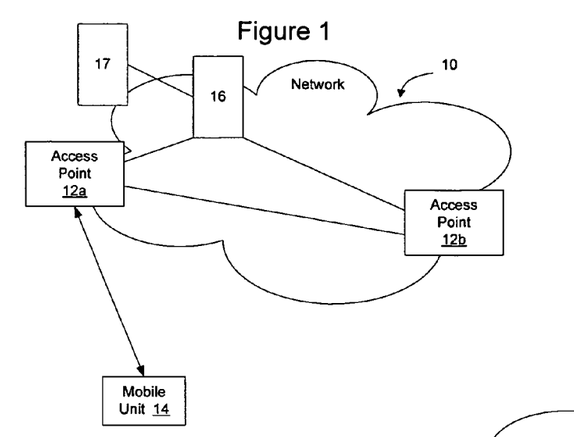
FIGS. 1-3 are functional block diagrams of a communication network including a MU configured to roam between access points according to an embodiment of the invention.

FIG. 1 illustrates an example of a network 10 in which wireless access points 12 (12a, 12b) are configured to provide wireless service to mobile units 14. The access points may be connected to high bandwidth resources such as by interconnecting to a switch 16. The access points may also be directly interconnected if desired.

Figure 2:
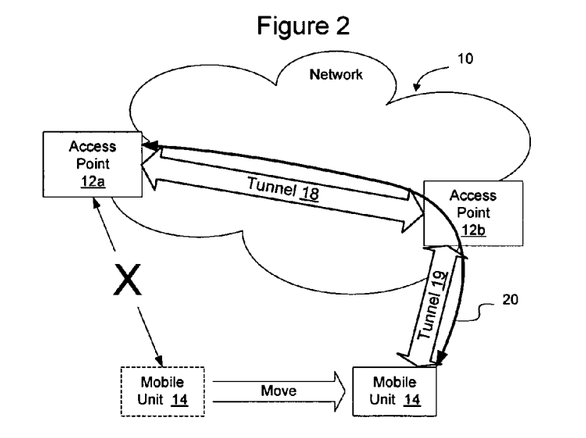

When a mobile unit 14 moves away from the access point that is providing it with wireless services (access point 12a), or when the access point moves away from the mobile unit, the mobile unit may form a new association with a different access point (12b) to continue receiving wireless services on the communication network. Since the process of reestablishing a connection between the mobile unit and a new access point 12b is relatively lengthy, according to an embodiment of the invention as shown in FIG. 2, a fast transition may occur in which data 20 is tunneled over tunnel 18 from the first access point 12a to the second access point 12b, and relayed by the second access point 12b to the mobile unit 14 over tunnel 19 without having the mobile unit 14 go through the whole authentication process with the second access point 12b. Thus, the established, secure data path between the mobile unit 14 and the old access point 12a is extended via tunnels 18 and 19 through the new access point 12b.

Figure 3:
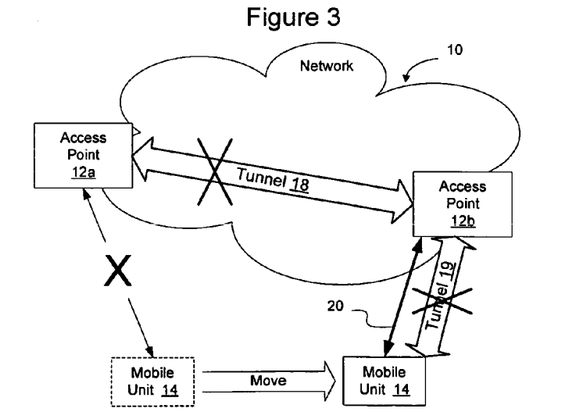

By causing the data path to be immediately extended through the new access point 12b, the mobile unit may continue to use the secure data path established with the old access point while the transition from the first access point to the second access point occurs. Alternatively, it may be that the data is continued to be tunneled from the first access point 12a to the second access point 12b and a full handover between access points does not occur. Thus, in this alternative scenario, mobility between access points is accomplished without requiring handovers to occur or while allowing the handovers to occur less frequently. Where a handover is to occur, as shown in FIG. 3, the mobile unit will go through the conventional authentication and authorization processes with the new access point 12b, and then a formal transfer of responsibility from the first access point to the second access point 12b will occur. When this happens, the tunnels 18 and 19 will be terminated and communication will occur directly between the new access point 12b and the mobile unit 14. At this point mobile unit 14 has reestablished a connection with the network 10 via new access point 12b.

Tunnels may extend between multiple access points as the mobile unit moves around the network and attaches to new access points. For example, if the mobile unit were to move to a third access point, a third tunnel may be established from the old access point 12a to the third access point (not shown). Thus, as the mobile unit moves on the network, new tunnels may be created between access points so that the data path may continue to follow the mobile unit on the network. Alternatively, the third access point may be configured to create a tunnel back to the second access point 12b, which has a tunnel to the first access point 12a.

Figure 4:
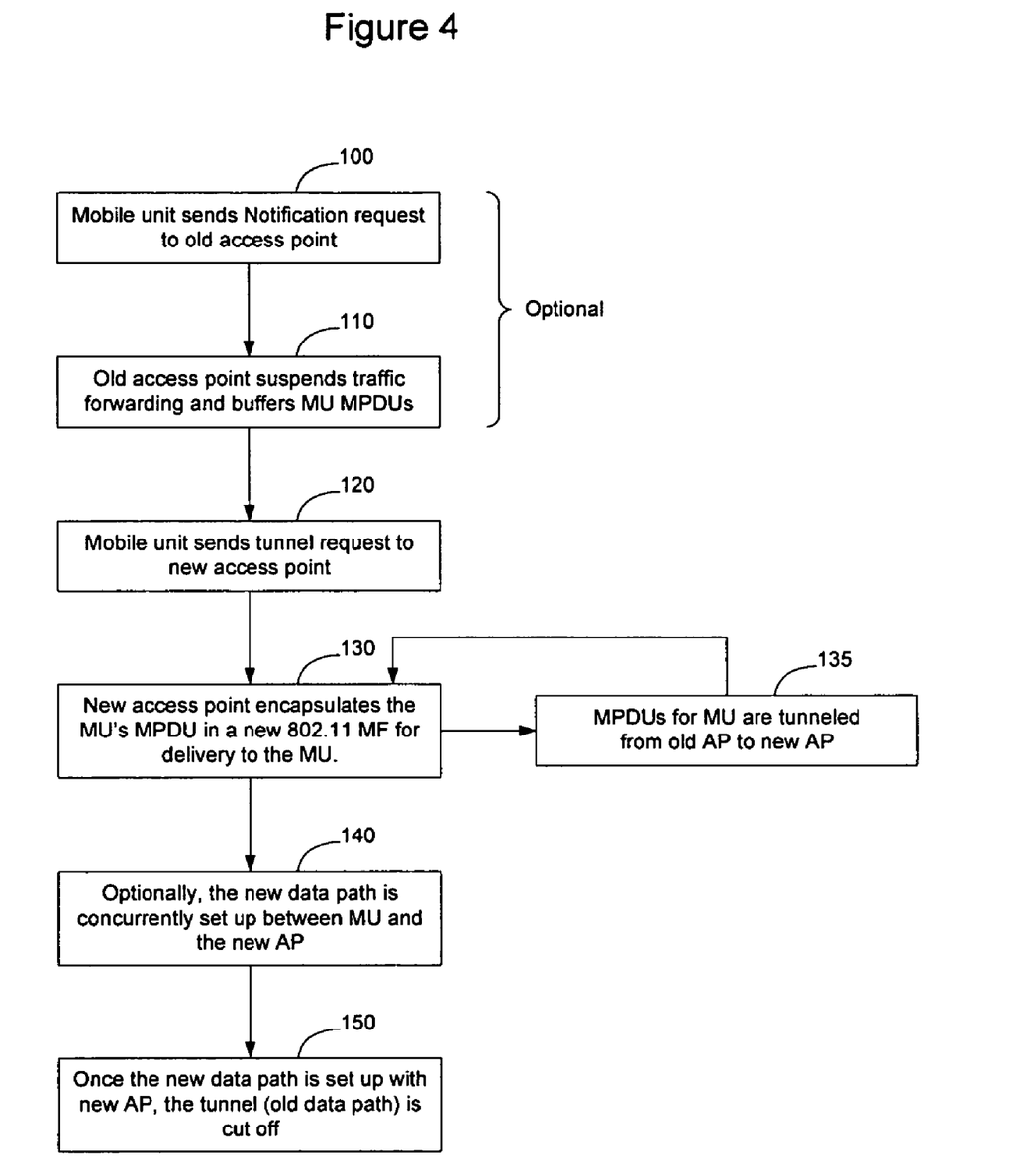
FIG. 4 is a flow diagram of a process of enabling the transfer of a mobile unit data path between access points in a wireless network according to an embodiment of the invention.

FIG. 4 is a flow diagram of a process of enabling the transfer of a mobile unit data path between access points in a wireless network according to an embodiment of the invention. While particular messages may be described in connection with FIG. 4, the invention is not limited to this particular sequence of messages as other sequences may be used as well. Also, the messages in the following description have been given particular names for ease of reference. The names of the messages may change without departing from the scope of the invention.

As shown in FIG. 4, when a mobile unit switches from a first access point to a second access point, it may send a transition notification message to the old access point (100). This message is optional, since the mobile unit may not be able to communicate with the old access point. However, where possible, transmission of the message to the old access point may accelerate establishment of a tunnel from the old access point to the new access point. Additionally, this message may form a signal to the old access point that the old access point should stop sending data to the mobile unit and begin buffering that data.

Upon receipt of a transition notification message, the old access point 12a will suspend traffic forwarding and buffer the traffic for the mobile unit (110). By doing so, the old access point will save any traffic that is intended to be transmitted to the mobile unit until the tunnel is established so that the access point will not lose any data during the transition between access points.

The mobile unit will next send a transition tunnel request to the new access point 12b (120) to notify the new access point of its intention to extend an existing association with the old access point through the new access point and to inform the new access point of the identity of the old access point 12a. The new access point, upon receipt of this message, will establish a tunnel with the old access point 12a (130) and allow data to be transmitted via the tunnel from the old access point to the new access point and, via the new access point, to the mobile unit via a second tunnel. Specifically, as shown in FIG. 4, the new access point 12b receives MAC Protocol Data Units (MPDUs) from the old access point and encapsulates the mobile unit's MPDUs into a new 802.11 Management Frame (MF) for tunneled delivery to the mobile unit via tunnel 19. Similarly, data from the mobile unit may be transmitted over the second tunnel 19 from the mobile unit to the new access point and from there over the first tunnel 18 to the old access point. Although the MPDUs may be encapsulated into management frames on the second tunnel 19 from the new access point 12b to the mobile unit 14, the invention is not limited in this regard as the MPDUs may also be encapsulated into data frames for transmission over the tunnel 19, or alternately sent as regular, unencapsulated, data frames.

Until a reassociation occurs to transfer responsibility from the old access point 12a to the new access point 12b, MPDUs are tunneled from the old access point to the new access point (140). Traffic may be tunneled indefinitely or reassociation may occur relatively quickly, depending on the particular circumstances. For example, access points may be mounted on the same rack of a telecommunications switching system with connections to local or remote antennas. In this instance, it may not make sense to move the context of the session from a process associated with the first access point to a process associated with the second access point since the two access points exist within the same switching system unit, data closet, central office, or other provider facilities. Additionally, the access points may actually be virtual access points implemented as processes in the same network element which is in turn connected to the actual remote simple RF devices or antennas. In this instance, it may not make sense to cause a handover to occur and cause effort, time, and resources to be expended to reauthenticate the mobile unit with the new virtual access point. Thus, tunneling of traffic between the access points may persist indefinitely.

Where transition from the first to the second access point is to be completed, once a new data path is set up between the new access point 12b and the mobile unit, the tunnel 19 between the access point 12b and the mobile unit 14 and the tunnel 18 between the access points 12a, 12b will be terminated (150), and communication will commence over the new data path.

Figure 5:
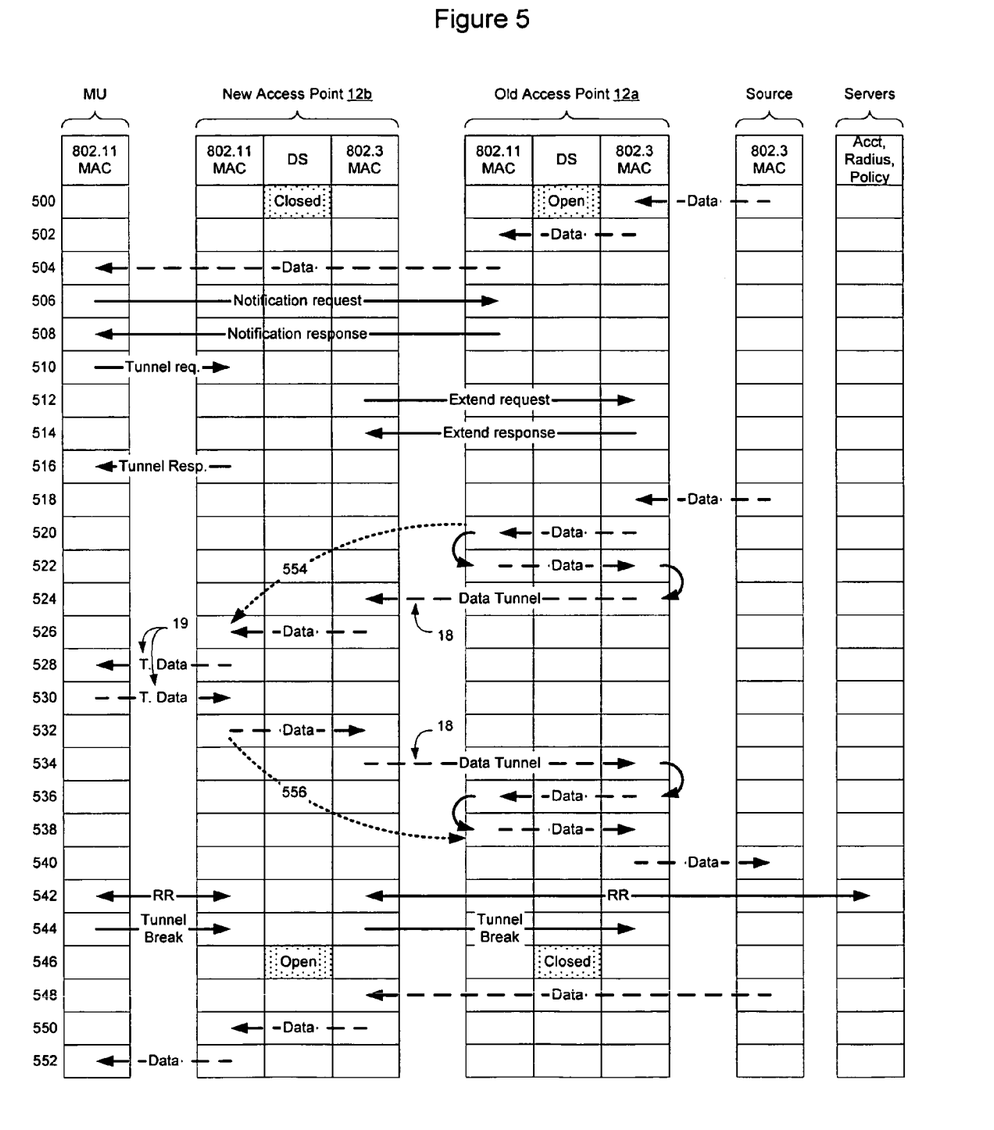
FIG. 5 shows one possible exchange of messages that may be used to transition access points according to an embodiment of the invention.

FIG. 5 illustrates an example exchange of messages that may occur to implement an embodiment of the invention. The invention is not limited to this particular exchange of messages, however, as many different types of messages may be used to set up a tunnel 18 between the old and new access points, to set up a tunnel 19 between the new access point 12b and the mobile unit, and to cause data traffic to be delivered over the tunnels 18, 19. Similarly, additional messages may be used to carry additional pieces of information depending on the embodiment selected to implement the invention. The invention will be described in the context of 802.11. The invention is not limited in this regard as embodiments of the invention may also be used in connection with other wireless protocols as well, such as 802.15 (commonly referred to as Bluetooth) and 802.16 or 802.16e (commonly referred to as WiMax).

As shown in FIG. 5, initially data (500) from a source such as server 17 is passed over the communication network to the old access point 12a and received at the access point on an interface such as an 802.3 MAC. A distribution system (DS), also referred to as a gate, in the old access point 12a is open to pass the data (502) received on the old access point 802.3 port to the old access point 802.11 MAC. The data (504) is transmitted from the old access point's 802.11 MAC to the mobile unit. In the reverse direction (not shown), the data from the mobile unit follows the same path—from the mobile unit to the 802.11 MAC of the access point 12a, and out the 802.3 MAC of the old access point 12a onto the network 10.

When a mobile unit is to transition to a new access point 12b, it may optionally send a notification request (506) to the old access point 12a. The notification request (506) may include the ID of the new access point 12b, to allow the old access point to learn the identity of the new access point. The notification request may optionally allow the old access point to suspend forwarding of data to the mobile unit and begin buffering data for transmission to the mobile unit once the tunnel has been established.

The old access point 12a will generate a notification response (508) to indicate to the mobile unit that the notification request has been received. The notification request (506) and response (508) are optional messages that may be used to notify the old access point that a transition will be occurring to a new access point. These messages may be omitted if desired or if it is not possible for the mobile unit to transmit these messages due to signal conditions on the network. The notification request may be helpful to the old access point since it can be used by the old access point as an instruction to begin buffering MPDUs rather than transmitting them over the wireless network to the mobile unit.

The mobile unit will also initiate communications with the new access point 12b. In the embodiment shown in FIG. 5, the mobile unit is configured to start this process by sending a tunnel request (510) to the new access point 12b. The tunnel request (510) may be formatted according to the 802.11 protocol and will be received at the new access point's 802.11 MAC. The tunnel request (510) may be formatted to provide the new access point with the identity of the old access point and may contain other identifying information to enable the new access point to set up a tunnel with the old access point. For example, the tunnel request (510) may include mobile unit identifying information to enable the mobile unit to be identified to the old access point so that the old access point may determine whether communication should be provided over the tunnel with the new access point. The identifying information, in this instance, enables the old access point to ensure that the mobile unit is the same mobile unit that was previously communicating with the old access point so that the old access point is able to extend the secure channel to the same mobile unit across the new tunnel via the new access point. Additionally, encryption information may be included in the tunnel request to enable the participants to verify the mobile unit as the same mobile unit that was previously communicating with the old access point.

The new access point will interface with the old access point by sending an extend request message (512) to the old access point. The extend request message will identify the new access point and the mobile unit, and can contain any other information required to establish the tunnel between the two access points. Optionally, the tunnel between the access points may be secured, e.g. via a key exchange between the access points, although the invention is not limited in this manner. The tunnel may be extended directly between the access points or may pass through one or more intermediate network elements 16 on the communication network 10.

The old access point, upon receipt of the extend request message (512) will generate a extend response message (514) to indicate to the new access point whether the tunnel will be established. The extend response message (514) may contain whatever parameters are required to establish the tunnel between the access points. Optionally, the extend response message (514) may contain any MPDUs that have been buffered for the mobile unit by the old access point, although the invention is not limited in this regard as the buffered MPDUs may be transmitted separately at a later time once the tunnel is established.

Once the tunnel has been established, the new access point will generate and transmit a tunnel response message (516) to the mobile unit to let the mobile unit know that the tunnel has been successfully established, and that the mobile unit may communicate via the new access point 12b. Optionally, where MPDUs have been transmitted to the new access point 12b by the old access point 12a, the tunnel response message (516) may include MPDUs that have been received by the new access point for the mobile unit. After a successful request, the new access point will encapsulate tunneled data traffic from the old access point into 802.11 management frames, thereby creating a second tunnel 19 between the access point and mobile unit, and transmit the encapsulated frames to the mobile unit. As mentioned above, the MPDUs may also be sent as regular, unencapsulated, data frames for transmission to the mobile unit over tunnel 19.

Once the tunnels are established, the tunnels may be used to forward data received by the old access point to the new access point, and then from the new access point to the mobile unit. Messages 518 through 540 show the flow that data will take while being transmitted from the source to the mobile unit (518-528) and from the mobile unit to the source (530-540). The particular path the data takes may vary depending on the implementation.

The preceding description has assumed that the new access point has sufficient capability to handle communications with the mobile unit. Where the new access point does not have sufficient capacity, it will reject the proposed tunnel request from the mobile unit. Similarly, where the information provided by the mobile unit is not recognized by the old access point, the new access point will not enable data to be tunneled through it to the mobile unit but will instead require the mobile unit to be authenticated before communication is resumed.

As shown in FIG. 5, once the tunnel is established, when data is received by the old access point 12a on its 802.3 MAC (518), the data will be forwarded by the old access point distribution system to the 802.11 MAC assigned to the mobile unit (520). However, since the 802.11 MAC has been instructed to forward the data over a tunnel rather than over the air to the mobile unit, the 802.11 MAC will transmit the data back via the distribution system to the old access point's 802.3 MAC (522) to be forwarded over the tunnel (524) to the new access point. Causing the data to be forwarded from the old access point's 802.3 MAC to the 802.11 MAC, and then back to the 802.3 MAC allows the 802.11 MAC to maintain the state of the interface with the mobile unit, so that the old access point does not need to implement this processing in the 802.3 interface. Thus, communication on the network from the source to the old access point, and from the old access point to the mobile unit, may be handled by the old access point 802.3 and 802.11 MACs, just as they were prior to creation of the tunnel. The 802.11MAC, however, will cause the data to be transmitted via the tunnel rather than wirelessly, so that the data may be passed through a wireless interface of the new access point.

When the new access point 12b receives the data (524) on its 802.3 MAC, it will pass the data to the 802.11 MAC for the access point (526) and tunnel the data over wireless tunnel 19 to the mobile unit (528). In this manner, data received at the old access point may be tunneled to the new access point and tunneled from the new access point to the mobile unit without requiring the mobile unit to undergo authentication and validation procedures with the new access point. Rather, the context established with the old access point may be extended over the tunnel to the new access point to enable the mobile unit to continue to use the previous context to continue communications on the wireless network. This decouples the authentication processing from the handover, to allow the authentication, quality of service, and other signaling generally associated with performance of a handover to be performed at another convenient time, while allowing the data path transfer to occur very quickly and with minimal disruption to the mobile unit's ability to receive and transmit data on the network.

In the reverse path, from the mobile unit to the source (530-540), data that is transmitted by the mobile unit (530) will be received by the new access point 12b on its 802.11 MAC and passed to the new access point's 802.3 MAC (532). The 802.3 MAC will tunnel the data (534) to the 802.3 MAC of the old access point 12a. Upon receipt, the old access point 12a will pass the data to the 802.11 MAC for the access point (536) to enable the data to be handled by the 802.11 MAC on the old access point as if it had been received from the mobile unit over a wireless interface attached to the old access point. Thus, the 802.11 MAC on the old access point may continue to perform whatever processing operations are generally required to be performed on transmissions received by the access point (such as decryption and unencapsulation) even though the data (534) was received over a tunnel rather than a wireless interface.

Once the old access point has processed the data on its 802.11 MAC interface, it will pass the data (538) to its 802.3 MAC where it will be forwarded onto the network (540). In this instance the data is shown as being forwarded to the source. The invention is not limited in this manner as the data may be addressed to any network address and is not limited to being forwarded to the source.

Tunneling between the old access point and new access point (518-540) may continue indefinitely. Alternatively, the old access point and new access point may transfer responsibility for communication from the old access point to the new access point by participating in conventional handover messaging (542). For example, the mobile unit may generate a reassociation request and pass the reassociation request to the new access unit. The new access point may then contact one or more external servers, such as an accounting server, radius server, policy server, and other external servers, to determine whether a direct association with the mobile unit is allowed. The handover process may include setting up Quality of Service (QoS) keys with the new access point, performing the 802.11e TSPEC security exchanges, and performing other common exchanges that generally occur in connection with a handover from one access point to another. Handover messaging may occur concurrently with transmission of tunneled MPDUs so that both data and control messages are being handled at the same time. Thus, the tunnel data (518-540) may be inter-mixed with other management frames, including authentication request/response messages, reassociation request/response messages, messages associated with the 802.11i four-way handshake, messages associated with 802.11e TSPEC, 802.1X full authentication, and other messages (542).

Assuming the handover is complete, i.e. once authentication has been established between the mobile unit and the new access point 12b, the mobile unit may send a tunnel break message (544) to the new access point 12b which will be relayed to the old access point 12a as well. In response, the new access point will open a distribution system (gate) (546) between its 802.3 MAC and 802.11 MAC for that mobile unit so that data may be received directly by the access point from the network. The new access point will also undertake, at this time, to notify the network that all future data for the mobile unit should be routed through the new access point. Similarly, the old access point will close its distribution system (gate) for the mobile unit to formally disassociate itself with the mobile unit (546). Optionally tunnel break response messages (not shown) may be returned from the old access point to the new access point and from the new access point to the mobile unit. Although the tunnel break was initiated in this embodiment by the mobile unit, the new access point could initiate the tunnel break process instead once the reassociation process between the mobile unit and the new access point has been completed.

Once the distribution system in the new access point has been opened, communication may occur directly between the mobile unit and the new access point 12b. Thus, data will be transmitted from the source to the new access point (548), passed by the new access point 802.3 MAC to the new access point 802.11 MAC via the distribution system (550), and then transmitted by the 802.11 MAC to the mobile unit (552). Traffic from the mobile unit (not shown) may follow the reverse path and be received by the new access point 802.11 MAC, transferred via the DS to the new access point 802.3 MAC, and then transmitted by the new access point via the 802.3 MAC. Additional messages may be exchanged as well, depending on the particular implementation, and the invention is not limited to an embodiment that exchanges the particular described messages.

By tunneling data MPDUs from an old access point to a new access point, the old secure data path between the mobile unit and old access point is extended through the new access point, without requiring a new secure data path to be established between the mobile unit and new access point. Since the data path from the mobile unit to the old access point 802.11 MAC is secure, and the tunnel causes data to be looped through the old access point 802.11 MAC, the data path over the tunnel may be caused to be secure as well. This allows a secure data path extension to be established with minimal delay since the only signaling required is the signaling associated with setting up of the tunnel. In this manner, transition processing may be decoupled from movement of the mobile unit, so that the mobile unit may continue to receive uninterrupted access to data on the communication network.

One important consideration with wireless communication, is the establishment of security. To enable data to be tunneled from one access point to another access point, it is necessary to establish a trusted relationship between the access points. Where the access points are in the same administrative domain, this may be easily accomplished. Additionally, the communication channel between the old and new access points may be reasonably secured through common tunnel signaling protocols.

Tunnel signaling optionally may be protected to prevent data from being misdirected. For example, since a security association exists between the mobile unit and the old access point, the Pairwise Transient Key (PTK) in use on that path is still valid/fresh since the data path is not cut off—it is just extended through the tunnel. Thus, the tunnel request/response could be protected using the PTK between the mobile unit and old access point. For example, the mobile unit may attach a security payload in the tunnel request message, which will be forwarded by the new access point to the old access point for verification.

To prevent requests from being reused, for example in a request replay attack, a random number may be included in the request. The new access point can then attach a security payload generated by the old access point in its tunnel response message to the mobile unit. The new access point's basic service set ID (BSSID) may be included in this message to prevent rogue access points from intercepting and attempting to participate in the exchange. In this way the mobile unit may authenticate itself to the old access point and the new access point may prove to the mobile unit that it will be handling traffic from the old access point via the tunnel. Other ways of securing initialization of the tunnel may be used as well, and the invention is not limited to the use of this particular mechanism.

In the previous description it has been assumed that the old and new access points are instantiated on different devices or units. This is not always the case. For example, access points may be instantiated as separate processes on the same device, unit, or switch that are connected to different antennae placed at remote locations to communicate with mobile units on the network. The processing, in this instance, for the two access points may occur within the same network element. In this instance, since the communications between the access points is all contained within a given network element, it is not visible externally and hence may not need to be secured. Protecting the tunnel signaling thus is mainly important where the access points reside on different units, and inter-unit communications may make the exchange visible and hence vulnerable from a security standpoint.

Additionally, the nature of the tunneled communications between the access point instances may take on a completely different form since the 802.11 MAC and 802.3 MAC components of the access point instances may be of a logical form rather than an actual physical form. For example, as shown in FIG. 5, when the access point instances are instantiated on the same unit, the data may be transmitted directly from the 802.11 MAC on the old access point to the 802.11 MAC on the new access point (arrows 554 and 556) since it is not necessary to cause the data to be tunneled between the logical entities using 802.3 MACs. Since the traffic loops through the 802.11 MAC on the old access point, the security and quality of service attributes may be guaranteed. However, since the access points are logical entities, data traffic in this instance may be passed directly between the 802.11 MACs for example by causing the data to be transferred from a queue associated with the first 802.11 MAC to the second 802.11 MAC. Thus, where the access points are instantiated on the same unit, the tunneling process may be simplified by causing data to be directly transmitted between the 802.11 MACs via tunnel 18 set up as shown by arrows 554 and 556. The invention is not limited to an embodiment that uses the particular signaling mechanisms to set up the tunnels as the particular signaling and tunneling aspects may depend on the manner in which the access points are deployed in the network.

The tunnel signaling may be formed to be compliant with existing 802.11 mechanisms (including 802.11e and 802.11i) so that the system may be deployed on existing networks. Additionally, since resources are only used as needed, pre-allocation of resources before handover is not required. This minimizes the resource usage on both the mobile unit and on the access points. For example, it is not necessary for pre-setup information to be transferred from the old access point to all adjacent access points to enable handovers to be accelerated should the mobile unit decide to re-associate with a different access point, since the data path may be quickly diverted to the new access point via a tunnel.

Figure 6:
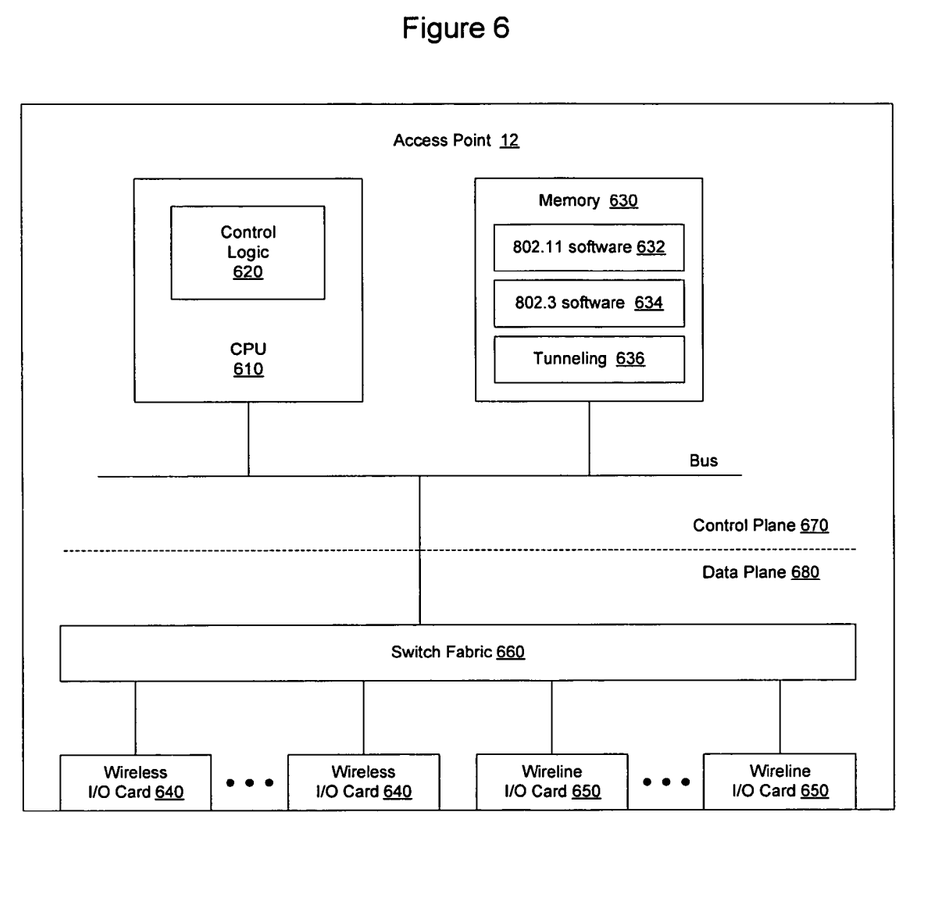
FIG. 6 is a functional block diagram of an access point according to an embodiment of the invention.

FIG. 6 is a block diagram showing the relevant components of an example wireless access point 12 that may be used to support the creation of tunnels to enable the transfer of mobile unit data paths between access points in accordance with an embodiment of the invention. In the embodiment shown in FIG. 6, the access point 600 includes a processor 610 configured to execute control logic 620 configured to enable the access point to participate in the exchanges described in greater detail above. Access point 12 also includes a memory 630 containing data and instructions that may enable the control logic 620 on the processor 610 to be configured to implement the methods described in greater detail above. In the illustrated embodiment, the memory 630 includes 802.11 software 632, 802.3 software 634, and tunneling software 636. The tunneling software may be closely coupled with the other software code 632, 634, to enable tunnels to be established between access points as mobile units move within the network, and to enable data for the mobile units to be transmitted over tunnels between the access points so that the data paths may follow the mobile units as they move on the network.

The access point may also contain other components, such as one or more wireless I/O cards 640 configured to implement the 802.11 MAC interfaces and one or more wireline cards 650 configured to implement the 802.3 MAC interfaces. Optionally, these cards may be combined into integrated I/O cards. A switch fabric (or bus) 660 may interconnect the I/O cards to enable data received on any of the interfaces to be transferred to any of the other interfaces. Optionally, the wireless access point may be configured to have a control plane 670 configured to control operation of the access point and a data plane 680 configured to enable efficient handling of data packets by the wireless access point. The invention is not limited to the particular described access point as many different types of wireless access points may be used to implement embodiments of the invention.

It should be understood that all functional statements made herein describing the functions to be performed by the methods of the invention may be performed by software programs implemented utilizing subroutines and other programming techniques known to those of ordinary skill in the art. For example, the functions described herein may be implemented as software executing as control logic 620 on processor 610. Alternatively, these functions may be implemented in hardware, firmware, or a combination of hardware, software, and firmware. The invention is thus not limited to a particular implementation.

The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of enabling a data path between a first access point in a wireless network and a mobile unit to be extended to pass through a second access point in the same wireless network during a handoff process within the wireless network between the first and second access points, such that the data path extends from the first access point, to the second access point, and then to the mobile unit during the handoff process between base stations within the same wireless network, the method comprising the steps of:

receiving, by the first access point in the wireless network, a request from the second access point in the same wireless network to extend the data path between the first access point and the mobile unit over a tunnel from the first access point to the second access point so that data may be tunneled from the first access point to the second access point and provided by the second access point to the mobile unit during the handoff process between the first and second access points within the same wireless network before completion of the handoff process; and transmitting data intended for the data path over the tunnel to the second access point for transmission by the second access point to the mobile unit prior to completion of the handoff process between the first and second access points in the wireless network.

2. The method of claim 1, wherein the first access point has a first Media Access Control (MAC) associated with the data path, said MAC having established parameters for the data path.

3. The method of claim 2, wherein the parameters include at least security and quality of service parameters.

4. The method of claim 2, wherein the step of transmitting data intended for the data path comprises looping the data through the MAC associated with the data path.

5. The method of claim 2, wherein the first access point has a second MAC associated with an interface to a source and a third MAC associated with an interface to the tunnel, and wherein the step of transmitting data intended for the data path comprises receiving the data on the second MAC associated with an interface to the source, looping the data through the first MAC associated with the data path, and outputting the data via the third MAC associated with the interface to the tunnel.

6. The method of claim 1, further comprising the step of establishing the tunnel to the second access point.

7. The method of claim 6, further comprising the step of temporarily buffering data associated with the data path received after receipt of the request to extend the data path and before the tunnel to the second access point is established.

8. The method of claim 1, further comprising receiving by the first access point, a notification from the mobile unit that the data path will be extended to pass through the second access point.

9. A method of enabling a data path between a first access point in a wireless network and a mobile unit to be extended to pass through a second access point in the same wireless network during a handoff process within the wireless network between the first and second access points, such that the data path extends from the first access point, to the second access point, and then to the mobile unit during at least a part of the handoff process between base stations within the same wireless network, the method comprising the steps of:

receiving, by the second access point in the wireless network, a request from the mobile unit to have the data path extended from the first access point in the wireless network to pass through the second access point in the same wireless network so that data may be tunneled from the first access point to the second access point and provided by the second access point to the mobile unit during the handoff process between the first and second access points within the same wireless network before completion of the handoff process;

transmitting a request by the second access point to the first access point, to request the first access point to extend the data path between the first access point and the mobile unit over a tunnel from the first access point to the second access point so that data may be transmitted by the second access point to the mobile unit prior to completion of the handoff process between the first and second access points in the wireless network.

10. The method of claim 9, further comprising the step of establishing, by the second access point, a second tunnel between the second access point and the mobile unit.

11. The method of claim 10, further comprising the step of receiving over the first tunnel, by the second access point, data for transmission to the mobile unit.

12. The method of claim 11, wherein the step of establishing the second tunnel comprises encapsulating the data received over the first tunnel into at least one wireless management frame for transmission on the wireless network.

13. The method of claim 9, wherein the data path has at least security and quality of service parameters established by the first access point, and wherein the second access point does not re-establish the security or quality of service parameters associated with the data path.

14. The method of claim 9, further comprising the steps of:
receiving over the first tunnel, by the second access point, data for transmission to the mobile unit;
commencing transmitting, by the second access point, the data to the mobile unit; and
performing handover messaging with the mobile unit after commencing transmitting the data to the mobile unit so that the timing of handover messaging is decoupled from transmitting the data to the mobile unit.

15. A system, comprising:
a first wireless access point in a first wireless network;
a second wireless access point in the first wireless network; and
a mobile unit;
wherein a wireless data path with defined parameters is established between the mobile unit and the first wireless access point;
wherein a first tunnel is established between the first wireless access point and the second wireless access point; and
wherein the wireless data path is extended via the first tunnel to extend through the second wireless access point without requiring the second access point to reestablish the defined parameters for the wireless data path before data may be transmitted over the extended data path from the first wireless access point to the mobile unit via the second wireless access point.

16. The system of claim 15, wherein a second tunnel is established between the second wireless access point and the mobile unit, said second tunnel being configured to carry data on the wireless data path between the second wireless access point and the mobile unit.

17. The system of claim 16, wherein the second tunnel is formed by encapsulating the data in management frames of a wireless protocol.

18. The system of claim 17, wherein the wireless protocol is one of at least the protocols defined by IEEE 802.11, 802.15, and 802.16.

19. The system of claim 16, wherein the defined parameters comprise at least quality of service and security.

20. The system of claim 15, wherein the first tunnel is established using secure tunnel messaging.

21. The system of claim 15, wherein the first
a first and second wireless access points are instantiated as logical entities on a network element.

22. The system of claim 21, wherein the first wireless access point has a first Media Access Control (MAC) configured with the defined parameters associated with the data path,
wherein the second wireless access point has a second MAC configured to handle the traffic on the data path without having the parameters associated with the data path redefined.

23. The system of claim 22, wherein the first tunnel is established between the first MAC and second MAC by causing data to be transferred directly between the first and second MACs.

* * * * *